United States Patent [19]

Baggerly

[11] Patent Number: 5,030,460
[45] Date of Patent: Jul. 9, 1991

[54] SUGAR FREE FORMULATIONS FOR MARSHMALLOW BITS AND FROSTED COATINGS

[75] Inventor: Patricia A. Baggerly, Gurnee, Ill.

[73] Assignee: The Nutra Sweet Company, Deerfield, Ill.

[21] Appl. No.: 484,099

[22] Filed: Feb. 23, 1990

[51] Int. Cl.$^5$ ............................................. A23G 3/14
[52] U.S. Cl. ................................. 426/103; 426/548; 426/658
[58] Field of Search ................... 426/94, 548, 658, 89, 426/103

[56] References Cited

U.S. PATENT DOCUMENTS

| | | | |
|---|---|---|---|
| 3,345,186 | 10/1967 | Kania et al. | 99/199 |
| 4,024,290 | 5/1977 | Layton | 426/565 |
| 4,079,151 | 3/1978 | Schade et al. | 426/96 |
| 4,248,895 | 2/1981 | Stroz | 426/660 |
| 4,322,588 | 4/1982 | Vink | 426/568 |
| 4,415,595 | 11/1983 | Takemori | 426/305 |
| 4,622,233 | 11/1986 | Torres | 426/804 |
| 4,714,620 | 12/1987 | Bunick | 426/804 |
| 4,911,937 | 3/1990 | Crosello | 426/659 |
| 4,913,919 | 4/1990 | Cornwell | 426/302 |

Primary Examiner—Carolyn Paden
Attorney, Agent, or Firm—Jeffrey M. Hoster; John M. Sanders

[57] ABSTRACT

A formulation which may be used to produce sugar-free marshmallow bits and frosted coatings is disclosed. The marshmallow bits may be used in ready-to-eat cereals. The frosted coatings may be added to a variety of food products, including cereals, cookies, confections, pastries, and sweetened snack foods. The formulation preferably includes hydrogenated starch hydrolysate, egg whites, and aspartame.

13 Claims, No Drawings

SUGAR FREE FORMULATIONS FOR MARSHMALLOW BITS AND FROSTED COATINGS

BACKGROUND OF THE INVENTION

This invention relates to the field of breakfast cereals, pastries, and snack foods. More particularly, this invention relates to food components such as marshmallow bits and frosted coatings and fillings for ready-to-eat cereals, pastries, cookies, confections, and snack foods.

There are numerous popular breakfast cereals which contain marshmallow bits or flakes having a frosted coating. These marshmallow bits and coated flakes typically contain a high percentage of sugar. Many people enjoy the taste and mouthfeel of marshmallow bits and coated flakes, but for a variety of reasons, do not wish to consume the sugar contained in the bits and flakes. Products such as toaster pastries, confections, cookies and sweetened snack foods also contain frosted coatings.

Previous attempts to produce sugar-free marshmallow bits and frosted coating substances have not resulted in taste and textural characteristics similar to those products containing sugar. For example, sugar-free frosted coatings conventionally must be spray dried onto the surface of products. Sugar-free marshmallow bits are typically prepared with raw granular starch, which creates a chewy texture. Thus, such products and methods to produce the products are desired.

SUMMARY OF THE INVENTION

The invention is a formulation and process to make sugar-free marshmallow bits and frosted coatings for use in a variety of food products. A preferred formulation includes a bulking agent such as hydrogenated starch hydrolysate, a whipping agent such as egg whites, and aspartame. Sugar-free gelatin and various flavorings may also be added to the formulation. The formulation may be formed into marshmallow bits or applied onto the surface of food products or otherwise as a component part such as cereal flakes, toaster pastries, confections and sweetened snack foods. The resulting products have been found to have surprising piece integrity, taste and texture.

DETAILED DESCRIPTION OF THE PREFERRED EMBODIMENT

The preferred embodiment of the invention is a formulation which includes 43-95% by weight hydrogenated starch hydrolysate, 5-55% by weight egg whites, and 0.01-1% by weight high potency sweetening agent, preferably aspartame. A 75% solution of hydrogenated starch hydrolysate is heated to a temperature sufficient to remove excess moisture, which is typically greater than 100° C. The solution is removed from heat and slowly added to egg whites while the egg whites are being whipped. Aspartame is then added while mixing continues until particles are rehydrated and/or uniformly suspended. At this point, gelatin and flavorings may be added to the mix. The compostion will be in foam form at this point. The composition may be diluted with water or other diluents to reach the desired spreading consistency. Dilution is especially desirable for frosted coatings for cereal flakes and for coatings for toaster pastries and cookies.

For preparation of marshmallow bits, the composition is shaped and dried. For frosted coatings, the composition is added to the food product to be coated. The product is then dried to the desired moisture content.

The inventive marshmallow bits dissolve easily in the mouth and exhibit excellent taste properties. Surprisingly, the marshmallow bits have a stability or piece integrity in milk ("bowl life") which exceeds 15 minutes, a desirable characteristic for ready-to-eat cereals.

Other bulking agents may be used instead of hydrogenated starch hydrolysate, including hydrogenated glucose syrup, polyhydric alcohols, maltodextrins, polydextrose, or other agents capable of delivering the bulking and texture properties of sugar. Any of these agents may be blended to make a preferred agent.

A number of whipping agents may be used instead of egg whites, including dehydrogenated egg whites, soy proteins with phosphates, or gelatin. Blends of the above whipping agents may also be used.

Other high potency sweeteners may be substitited for aspartame, with the final product retaining the desired characteristics. These sweetener include alitame, saccharin, acesulfam K, trichlorogalactosucrose, or mixtures thereof.

Any commercially available powdered or liquid flavoring may also be added to the inventive formulation to provide desired flavoring and texture. Additional flavorings include, but are not limited to, fruit powders, nuts, crushed cereals, liquid vanillin flavor, or chocolate powder.

The following examples illustrate the process for making marshmallow bits and products containing frosted coating.

EXAMPLE 1

Hydrogenated starch hydrolysate (Hystar 6075 brand, manufactured by Lonza, Inc.) (290.0 g) was heated to 236° F. (113° C.). Fresh egg whites (119.0 g.) were whipped in a Hobart mixer for approximately two minutes at speed #3. While the egg whites were mixed, the hydrogenated starch hydrolysate was added and the mixture was mixed for one more minute. A preblended mixture of 1.8 g. aspartame (NutraSweet brand) and 10 ml. of water was then added to the hydrogenated starch dydrolysate/egg white mixture, which is whipped for an additional 15 seconds at speed #3. Vanillin was then added (0.25 g.) with the mixture whipped for an additional 15 seconds. The mixture was placed in a pastry bag using a #7 tip and drops were formed on a parchment covered baking sheet. The drops were slowly dried in an oven at 200° F. (93° C.) for 40 minutes. The drops were then cooled to room temperature.

The product made from this example may be admixed with ready-to-eat cereal. The product has the following composition:

| Hydrogenated starch hydrolysate | 70.55% |
| --- | --- |
| Egg White | 28.95% |
| Aspartame | 0.45% |
| Vanillin Flavor | 0.05% |

EXAMPLE 2

The composition and procedure of Example 1 were repeated except the whipped compostion was diluted with 60% by weight water. This yields a product which has a spreadable consistency.

The resulting product can be applied to the surface of ready-to-eat cereals, such as corn flakes, by any state-ofthe-art surface application technique or an internal mix nozzle until the desired level of coating has been applied. The desired level of coating is 10–40% by weight. The cereal which has been coated is then dried in an oven at 200° F. (93° C.) for 30–45 minutes to produce sugar-free frosted cereal.

EXAMPLE 3

The composition and procedure of Example 1 were repeated except the whipped composition was diluted with 40% by weight water. This yields a product which has a spreadable consistency.

The resulting product may be applied to prebaked toaster pastries, cookies, confections, or sweetened snack foods.

The principle of the invention and the best mode contemplated for applying that principle have been described. It is to be understood that the foregoing is illustrative only and that other means and techniques can be employed without departing from the true scope of the invention defined in the following claims.

What is claimed is:

1. A consumable product having a frosted coating, said frosted coating comprising:
    about 43 to 95% by weight hydrogenated starch hydrolysate,
    about 5 to 55% by weight egg white, and
    about 0.01 to 1% by weight sweetening agent.

2. The consumable product of claim 1 selected from the group consisting of cereals, cookies, pastries, sweentened snack foods and confections.

3. A process for the preparation of a formulation for marshmallow bits, comprising the steps of:
    mixing a bulking agent with a whipping agent in the presence of agitation;
    adding a sweentening agent to the mixture of said bulking agent and said whipping agent in the presence of agitation to form a marshmallow bit mixture;
    shaping said marshmallow bit mixture into the form of drops;
    drying and cooling said drops to form marshmallow bits.

4. The process of claim 3 wherein said bulking agent is selected from the group consisting of hydrogenated starch hydrolysate, hydrogenated glucose syrup, polyhydric alcohols, maltodextrins, polydextrose, and mixtures of any of said group.

5. The process of claim 3 wherein said whipping agent is selected from the group consisting of fresh egg whites, dehydrogenated egg whites, soy proteins with phosphates, gelatin, and mixtures of any of said group.

6. The process of claim 3 wherein said bulking agent is hydrogenated starch hydrolysate.

7. The process of claim 6 wherein said hydrogenated starch hydrolysate is heated to a temperature of at least about 100° C. before mixing with said whipping agent.

8. The process of claim 3 wherein said whipping agent is fresh egg whites.

9. The process of claim 3 wherein said sweetening agent comprises aspartame.

10. The process of claim 3 wherein said bulking agent comprises about 43–95% by weight of said marshmallow bits, said whipping agent comprises about 5 to 55% by weight of said marshmallow bits, and about 0.01–1% by weight sweetening agent.

11. The process of claim 3 further comprising the step of adding a flavoring agent to the mixture of said bulking agent and said whipping agent.

12. A process for the preparation of a formulation for frosted coating for consumable products, comprising the steps of:
    mixing a bulking agent with a whipping agent in the presence of agitation;
    adding a sweetening agent to the mixture of said bulking agent and said whipping agent in the presence of agitation; diluting the mixture of said bulking agent, whipping agent and sweetening agent with water to yield a mixture having a spreadable consistency;
    applying said mixture to a consumable product to be coated; and
    drying and cooling said coated consumable product.

13. The process of claim 12 wherein said consumable product is selected from the group consisting of cereals, pastries, confections, cookies and sweetened snack foods.

* * * * *